(12) United States Patent
Swing et al.

(10) Patent No.: US 8,244,962 B2
(45) Date of Patent: Aug. 14, 2012

(54) COMMAND PROCESSOR FOR A DATA STORAGE DEVICE

(75) Inventors: Andrew T. Swing, Los Gatos, CA (US);
Albert T. Borchers, Aptos, CA (US);
Robert S. Sprinkle, San Jose, CA (US);
Justin Kennington, New York, NY (US)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 12/537,722

(22) Filed: Aug. 7, 2009

(65) Prior Publication Data
US 2010/0262760 A1   Oct. 14, 2010

Related U.S. Application Data

(60) Provisional application No. 61/167,709, filed on Apr. 8, 2009, provisional application No. 61/187,835, filed on Jun. 17, 2009.

(51) Int. Cl.
*G06F 12/00* (2006.01)
*G06F 12/02* (2006.01)
*G06F 3/00* (2006.01)

(52) U.S. Cl. ......... 711/103; 711/E12.001; 711/E12.008; 710/6

(58) Field of Classification Search ........................ None
See application file for complete search history.

(56) References Cited

U.S. PATENT DOCUMENTS

| | | | |
|---|---|---|---|
| 4,449,182 A | 5/1984 | Rubinson et al. | |
| 4,777,595 A | 10/1988 | Strecker et al. | |
| 5,619,687 A | 4/1997 | Langan et al. | |
| 5,708,814 A | 1/1998 | Short et al. | |
| 5,802,345 A | 9/1998 | Matsunami et al. | |
| 5,844,776 A | 12/1998 | Yamaguchi et al. | |
| 5,941,998 A | 8/1999 | Tillson | |
| 6,003,112 A | 12/1999 | Tetrick | |
| 6,009,478 A | 12/1999 | Panner et al. | |

(Continued)

FOREIGN PATENT DOCUMENTS

EP       1736885 A2       12/2006

(Continued)

OTHER PUBLICATIONS

Non-Final Office Action for U.S. Appl. No. 12/537,727, mailed on Jun. 3, 2011, 15 pages.

(Continued)

*Primary Examiner* — Kevin Verbrugge
(74) *Attorney, Agent, or Firm* — Brake Hughes Bellermann LLP

(57) ABSTRACT

An apparatus for queuing and ordering commands for a data storage device may include a slot tracker module that is arranged and configured to track available slots for commands from a host, a command transfer module that is operably coupled to the slot tracker module and that is arranged and configured to retrieve commands from the host based on a number of the available slots, a pending command module that is operably coupled to the command transfer module and that is arranged and configured to queue and order the commands from the host for processing using an ordered list that is based on an age of the commands and a task dispatch module that is operably coupled to the pending command module and that is arranged and configured to dispatch the commands for processing using the ordered list from the pending command module and an availability of storage locations.

21 Claims, 6 Drawing Sheets

U.S. PATENT DOCUMENTS

| | | | |
|---|---|---|---|
| 6,167,338 A | 12/2000 | De Wille et al. | |
| 6,343,660 B1 | 2/2002 | Mutsears | |
| 6,640,290 B1 | 10/2003 | Forin et al. | |
| 6,678,463 B1 | 1/2004 | Pierre et al. | |
| 6,697,284 B2 | 2/2004 | Marotta | |
| 6,757,797 B1 | 6/2004 | Kaiya et al. | |
| 6,854,022 B1 | 2/2005 | Thelin | |
| 6,868,007 B2 | 3/2005 | Hasegawa et al. | |
| 6,938,188 B1 | 8/2005 | Kelleher | |
| 6,982,919 B2 | 1/2006 | Kumhara et al. | |
| 7,000,245 B1 | 2/2006 | Pierre et al. | |
| 7,012,632 B2 | 3/2006 | Freeman et al. | |
| 7,028,137 B2 | 4/2006 | Nashimoto et al. | |
| 7,080,245 B2 | 7/2006 | Ballard et al. | |
| 7,080,377 B2 | 7/2006 | Peled et al. | |
| 7,088,387 B1 | 8/2006 | Freeman et al. | |
| 7,114,051 B2 | 9/2006 | Guu et al. | |
| 7,127,549 B2 | 10/2006 | Sinclair | |
| 7,127,551 B2 | 10/2006 | Beck | |
| 7,158,167 B1 | 1/2007 | Yerazunis et al. | |
| 7,159,104 B2 * | 1/2007 | Dewey | 713/1 |
| 7,161,834 B2 | 1/2007 | Kumahara et al. | |
| 7,225,289 B2 | 5/2007 | Tee et al. | |
| 7,296,213 B2 | 11/2007 | Vainsencher et al. | |
| 7,310,699 B2 | 12/2007 | Sinclair | |
| 7,328,304 B2 | 2/2008 | Royer, Jr. et al. | |
| 7,356,637 B2 | 4/2008 | Tee et al. | |
| 7,370,230 B1 | 5/2008 | Flake | |
| 7,392,367 B2 | 6/2008 | Clark et al. | |
| 7,406,572 B1 | 7/2008 | Nguyen | |
| 7,546,393 B2 | 6/2009 | Day et al. | |
| 7,562,366 B2 | 7/2009 | Pope et al. | |
| 7,631,084 B2 | 12/2009 | Thomas et al. | |
| 7,660,306 B1 | 2/2010 | Eriksson et al. | |
| 7,668,177 B1 | 2/2010 | Trapp et al. | |
| 7,730,257 B2 | 6/2010 | Franklin | |
| 7,836,378 B2 | 11/2010 | Shaeffer et al. | |
| 7,865,809 B1 | 1/2011 | Lee et al. | |
| 7,904,639 B2 | 3/2011 | Kim et al. | |
| 8,037,234 B2 | 10/2011 | Yu et al. | |
| 8,051,253 B2 * | 11/2011 | Okin et al. | 711/154 |
| 8,086,936 B2 | 12/2011 | Gower et al. | |
| 2001/0023472 A1 | 9/2001 | Kubushiro et al. | |
| 2002/0005895 A1 | 1/2002 | Freeman et al. | |
| 2002/0053004 A1 | 5/2002 | Pong | |
| 2002/0078285 A1 | 6/2002 | Hofstee et al. | |
| 2002/0178307 A1 * | 11/2002 | Pua et al. | 710/62 |
| 2003/0058689 A1 | 3/2003 | Marotta | |
| 2003/0101327 A1 | 5/2003 | Beck | |
| 2003/0117846 A1 | 6/2003 | Hasegawa et al. | |
| 2003/0208771 A1 | 11/2003 | Hensgen et al. | |
| 2003/0221092 A1 | 11/2003 | Ballard et al. | |
| 2003/0225960 A1 | 12/2003 | Guu et al. | |
| 2004/0049649 A1 | 3/2004 | Durrant | |
| 2004/0078729 A1 | 4/2004 | Peter | |
| 2004/0236933 A1 * | 11/2004 | Dewey | 713/1 |
| 2005/0041509 A1 | 2/2005 | Kumahara et al. | |
| 2005/0160218 A1 | 7/2005 | See et al. | |
| 2005/0172067 A1 | 8/2005 | Sinclair | |
| 2005/0172087 A1 | 8/2005 | Klingman | |
| 2005/0177698 A1 | 8/2005 | Ku et al. | |
| 2005/0193164 A1 | 9/2005 | Royer et al. | |
| 2006/0053308 A1 | 3/2006 | Zimmerman | |
| 2006/0062052 A1 | 3/2006 | Kumahara et al. | |
| 2006/0123284 A1 | 6/2006 | Hwang et al. | |
| 2006/0206653 A1 | 9/2006 | Tee et al. | |
| 2007/0008801 A1 | 1/2007 | Chiang et al. | |
| 2007/0028040 A1 | 2/2007 | Sinclair | |
| 2007/0101238 A1 | 5/2007 | Resnick et al. | |
| 2007/0113150 A1 | 5/2007 | Resnick et al. | |
| 2007/0198796 A1 | 8/2007 | Warren, Jr. | |
| 2007/0208900 A1 | 9/2007 | Tee et al. | |
| 2007/0255890 A1 | 11/2007 | Urata et al. | |
| 2007/0255981 A1 | 11/2007 | Eto et al. | |
| 2007/0288686 A1 | 12/2007 | Arcedera et al. | |
| 2007/0288692 A1 | 12/2007 | Bruce et al. | |
| 2008/0010431 A1 | 1/2008 | Chang et al. | |
| 2008/0022186 A1 | 1/2008 | Co et al. | |
| 2008/0040531 A1 | 2/2008 | Anderson | |
| 2008/0052448 A1 | 2/2008 | Minz et al. | |
| 2008/0052449 A1 | 2/2008 | Kim et al. | |
| 2008/0052451 A1 | 2/2008 | Pua et al. | |
| 2008/0059747 A1 | 3/2008 | Burckart et al. | |
| 2008/0065815 A1 * | 3/2008 | Nasu et al. | 711/103 |
| 2008/0077727 A1 | 3/2008 | Baca et al. | |
| 2008/0126658 A1 | 5/2008 | Wang | |
| 2008/0147931 A1 | 6/2008 | McDaniel et al. | |
| 2008/0155160 A1 | 6/2008 | McDaniel | |
| 2008/0163030 A1 | 7/2008 | Lee | |
| 2008/0178025 A1 | 7/2008 | Hand et al. | |
| 2008/0209157 A1 | 8/2008 | Weng | |
| 2008/0222491 A1 | 9/2008 | Lee et al. | |
| 2008/0235467 A1 | 9/2008 | Tagawa | |
| 2008/0288814 A1 | 11/2008 | Kitahara | |
| 2008/0294814 A1 | 11/2008 | Gorobets | |
| 2008/0301349 A1 | 12/2008 | Bacha | |
| 2008/0301381 A1 | 12/2008 | Lee et al. | |
| 2008/0320214 A1 * | 12/2008 | Ma et al. | 711/103 |
| 2009/0006720 A1 | 1/2009 | Traister | |
| 2009/0037652 A1 * | 2/2009 | Yu et al. | 711/103 |
| 2009/0044078 A1 | 2/2009 | Vogan et al. | |
| 2009/0055590 A1 | 2/2009 | Takahashi | |
| 2009/0063895 A1 | 3/2009 | Smith | |
| 2009/0063922 A1 | 3/2009 | Gower et al. | |
| 2009/0063934 A1 | 3/2009 | Jo | |
| 2009/0119443 A1 | 5/2009 | Tremaine | |
| 2009/0125785 A1 | 5/2009 | Gorobets et al. | |
| 2009/0125790 A1 | 5/2009 | Iyer et al. | |
| 2009/0240873 A1 | 9/2009 | Yu et al. | |
| 2009/0265513 A1 | 10/2009 | Ryu | |
| 2010/0049914 A1 * | 2/2010 | Goodwin | 711/114 |
| 2010/0153660 A1 | 6/2010 | Lasser et al. | |
| 2010/0211737 A1 | 8/2010 | Flynn et al. | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2010/0269015 A1 | 10/2010 | Borchers et al. | |
| 2010/0287217 A1 | 11/2010 | Borchers et al. | |
| 2011/0191554 A1 | 8/2011 | Sakai | |
| 2011/0213921 A1 | 9/2011 | Yu et al. | |
| 2011/0238885 A1 | 9/2011 | Kitahara et al. | |
| 2012/0030416 A1 | 2/2012 | Borchers et al. | |
| 2012/0030507 A1 | 2/2012 | Borchers et al. | |
| 2012/0030542 A1 | 2/2012 | Borchers et al. | |

FOREIGN PATENT DOCUMENTS

| | | |
|---|---|---|
| JP | 2004-071033 | 3/2004 |
| WO | 01/33852 A1 | 5/2001 |
| WO | 01/90900 A1 | 11/2001 |
| WO | 02/03388 A2 | 1/2002 |
| WO | 02/11424 A2 | 2/2002 |
| WO | 02/058383 A1 | 7/2002 |
| WO | 2005/081097 A2 | 9/2005 |
| WO | 2005/093588 A2 | 10/2005 |
| WO | 2005/081097 A3 | 11/2005 |
| WO | 2005/093588 A3 | 12/2006 |
| WO | 2007/072313 A2 | 6/2007 |
| WO | 2007/072317 A2 | 6/2007 |
| WO | 2007/072317 A3 | 6/2007 |
| WO | 2007/096844 A2 | 8/2007 |
| WO | 2007/096844 A3 | 8/2007 |
| WO | 2007/146756 A2 | 12/2007 |
| WO | 2007/146845 A2 | 12/2007 |
| WO | 2008/022094 A2 | 2/2008 |
| WO | 2008/040028 A2 | 4/2008 |
| WO | 2008/025238 A1 | 6/2008 |

| | | |
|---|---|---|
| WO | 2008/147752 A1 | 12/2008 |
| WO | 2010/117877 A1 | 10/2010 |
| WO | 2010/117878 A1 | 10/2010 |

OTHER PUBLICATIONS

Non-Final Office Action Response for U.S. Appl. No. 12/537,727, filed Mar. 14, 2011, 11 pages.
International Search Report and Written Opinion received for PCT Application No. PCT/US2010/029677, mailed on Jul. 5, 2010, 13 pages.
International Search Report and Written Opinion received for PCT Application No. PCT/US2010/029679, mailed on Jul. 5, 2010, 20 pages.
International Search Report and Written Opinion received for PCT Application No. PCT/US2010/029916, mailed on Jul. 7, 2010, 14 pages.
International Search Report and Written Opinion received for PCT Application No. PCT/US2010/029917, mailed on Jul. 28, 2010, 19 pages.
International Search Report and Written Opinion received for PCT Application No. PCT/US2010/029919, mailed on Jul. 28, 2010, 11 pages.
International Search Report and Written Opinion received for PCT Application No. PCT/US2010/030389, mailed on Jul. 21, 2010, 11 pages.
U.S. Appl. No. 12/537,733, filed Aug. 7, 2009.
U.S. Appl. No. 12/537,727, filed Aug. 7, 2009.
U.S. Appl. No. 12/537,725, filed Aug. 7, 2009.
U.S. Appl. No. 12/537,722, filed Aug. 7, 2009.
U.S. Appl. No. 12/537,719, filed Aug. 7, 2009.
U.S. Appl. No. 12/756,009, filed Apr. 7, 2010, 35 pages.
U.S. Appl. No. 12/537,709, filed Aug. 7, 2009.
U.S. Appl. No. 12/755,968, filed Apr. 7, 2010, 41 pages.
U.S. Appl. No. 12/755,964, filed Apr. 7, 2010, 44 pages.
U.S. Appl. No. 12/537,748, filed Aug. 7, 2009.
U.S. Appl. No. 12/537,738, filed Aug. 7, 2009.
U.S. Appl. No. 12/756,007, filed Apr. 7, 2010, 54 pages.
U.S. Appl. No. 12/756,477, filed Apr. 8, 2010, 51 pages.
Non Final Office Action for U.S. Appl. No. 12/537,727, mailed on Dec. 13, 2010, 20 pages.
Non-Final Office Action for U.S. Appl. No. 12/755,968, mailed Jan. 26, 2012, 32 pages.
Non-Final Office Action for U.S. Appl. No. 13/269,985, mailed Jan. 6, 2012, 24 pages.
Non-Final Office Action for U.S. Appl. No. 12/537,709, mailed Dec. 19, 2011, 28 pages.
Non-Final Office Action for U.S. Appl. No. 12/537,719, mailed Nov. 30, 2011, 29 pages.
Final Office Action for U.S. Appl. No. 12/537,704, mailed Apr. 6, 2012, 15 pages.
Non-Final Office Action for U.S. Appl. No. 12/537,704, mailed Nov. 28, 2011, 24 pages.
Non-Final Office Action for U.S. Appl. No. 12/537,748, mailed Dec. 12, 2011, 24 pages.
Non-Final Office Action for U.S. Appl. No. 12/537,741, mailed Dec. 21, 2011, 25 pages.
Non-Final Office Action for U.S. Appl. No. 12/537,738, mailed Dec. 12, 2011, 25 pages.
Non-Final Office Action for U.S. Appl. No. 12/537,725, mailed Jan. 30, 2012, 33 pages.
Non-Final Office Action for U.S. Appl. No. 13/269,972, mailed Jan. 5, 2012, 26 pages.
Non-Final Office Action Response for U.S. Appl. No. 12/537,704, filed Feb. 28, 2012, 25 pages.
Non-Final Office Action Response for U.S. Appl. No. 12/537,709, filed Mar. 19, 2012, 25 pages.
Paris, et al, "Evaluating the Impact of Irrecoverable Read Errors on Disk Array Reliability", 15th IEEE Pacific Rim International Symposium on Dependable Computing, Nov. 16-18, 2009, 6 pages.
Takeuchi, "Novel Co-Design of NAND Flash Memory and NAND Flash Controller Circuits for Sub-30 nm Low-Power High-Speed Solid-State Drives (SSD),", IEEE Journal of Solid-State Circuits, vol. 44, No. 4, Apr. 2009, pp. 1227-1234.
Non-Final Office Action Response for U.S. Appl. No. 12/537,719, filed Feb. 29, 2012, 23 pages.
Non-Final Office Action Response for U.S. Appl. No. 12/537,727, filed Aug. 31, 2011, 15 pages.
Non-Final Office Action for U.S. Appl. No. 12/537,727, mailed Nov. 8, 2011, 13 pages.
Non-Final Office Action Response for U.S. Appl. No. 12/537,727, filed Mar. 8, 2012, 22 pages.
Non-Final Office Action for U.S. Appl. No. 12/537,733, mailed Mar. 14, 2012, 23 pages.
Non-Final Office Action Response for U.S. Appl. No. 13/269,183, filed Mar. 27, 2012, 17 pages.
Non-Final Office Action for U.S. Appl. No. 13/269,183, mailed Dec. 27, 2011, 27 pages.
Non-Final Office Action Response for U.S. Appl. No. 13/269,972, filed Apr. 4, 2012, 25 pages.
Non-Final Office Action Response for U.S. Appl. No. 13/269,985, filed Apr. 4, 2012, 26 pages.
Notice of Allowance for U.S. Appl. No. 12/537,709, mailed Apr. 6, 2012, 14 pages.
Final Office Action for U.S. Appl. No. 12/537,719, mailed Apr. 9, 2012, 21 pages.
Wen, "A Processor-DMA-Based Memory Copy Hardware Accelerator", 6th IEEE International Conference on Networking, Architecture and Storage (NAS), Jul. 30, 2011, pp. 225-229.
Non-Final Office Action Response for U.S. Appl. No. 12/537,725, filed Apr. 27, 2012, 12 pages.
Notice of Allowance for U.S. Appl. No. 13/269,972, mailed May 23, 2012, 18 pages.
Non-Final Office Action for U.S. Appl. No. 13/269,985, mailed Jun. 06, 2012, 19 pages.
Notice of Allowance for U.S. Appl. No. 13/269,183, mailed Apr. 19, 2012, 15 pages.
Notice of Allowance for U.S. Appl. No. 12/537,727, mailed Apr. 24, 2012, 14 pages.
Non-Final Office Action Response for U.S. Appl. No. 12/537,748, filed May 02, 2012, 13 pages.
Notice of Allowance for U.S. Appl. No. 12/537,725, mailed May 21, 2012, 18 pages.

* cited by examiner

COMMAND PROCESSOR FOR A DATA STORAGE DEVICE

CROSS REFERENCE TO RELATED APPLICATIONS

This application claims the benefit of U.S. Provisional Application No. 61/167,709, filed Apr. 8, 2009, and titled "Data Storage Device" and U.S. Provisional Application No. 61/187,835, filed Jun. 17, 2009, and titled "Partitioning and Striping in a Flash Memory Data Storage Device," both of which are hereby incorporated by reference in entirety.

TECHNICAL FIELD

This description relates to a command processor for a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

The throughput of the command execution on the data storage device may be related to the number of commands that may be processed by the data storage device. It may be desirable to achieve a high throughput for the data storage device by increasing the number of commands that may be processed by the data storage device.

SUMMARY

This document describes a command processor for tracking, ordering, queuing and processing commands from a host for execution on a data storage device. The command processor may be arranged and configured to track incoming commands from the host by assigning a global slot identifier to each of the commands and to queue and order the commands using an ordered list that is based on the age of the commands. The command processor may be configured to maintain the order of the commands as received from the host for commands that are designated for a same storage location. The command processor also may be configured to take the commands out of order for commands that are designated for different storage locations. In this manner, the order of the commands is maintained where it is important to maintain the order, as received from the host. At the same time, the command processor keeps all of the storage locations substantially busy by taking commands out of order for commands that are designated for different storage locations. The command processor enables parallel processing of commands by substantially all of the storage locations having designated commands in the command queue.

In one exemplary implementation, the command processor may be implemented as part of a field programmable gate array (FPGA) controller, where the FPGA controller may be a part of a data storage device. The ordered list may be implemented as a doubly linked list, where the commands received from the host may be sorted in the list based on the age of the commands.

The data storage device may include one or more memory boards, where each of the memory boards includes multiple memory devices. In one exemplary implementation, each of the memory boards may include multiple flash memory chips. The memory boards may include multiple channels, where one or more of the flash memory chips may be assigned to each of the channels. The data storage device may include a controller board to which the memory boards operably connect. The data storage device may be configured to communicate with a host using an interface to receive commands from the host and to process those commands using the flash memory chips. For example, the host may send and the controller board may receive commands to read, write, copy and erase blocks of data using the flash memory chips.

In one exemplary implementation, the controller includes a field-programmable gate array (FPGA) controller and the interface between the host and the controller board may be a high speed interface such as, for example, a peripheral component interconnect express (PCIe) interface. In this manner, the data storage device may include high storage volumes and may be configured to achieve high performance and high speeds of data transfer between the host and the flash memory chips.

In one exemplary implementation, the data storage device may be configured with two memory boards with each of the memory boards including multiple flash memory chips. The data storage device, including the controller board and two memory boards, may be configured in a disk drive form such that the data storage device fits in an on-board drive slot of a computing device. For instance, the data storage device may be configured to fit in an on-board drive slot of a server to provide data storage capacity for the server. The data storage device may be configured to be removable such that it may be removed easily from the computing device and inserted in the on-board drive slot of a different computing device.

In other exemplary implementations, each of the memory boards may include memory devices other than flash memory chips. For example, each of the memory boards may include multiple dynamic random access memory (DRAM) chips. In other exemplary implementations, the memory boards may include other types of memory devices including, for example, phase change memory (PCM) chips and other types of memory devices.

In one exemplary implementation, the command processor may be configured to retrieve commands from the host and queue the commands using the ordered list. The command processor may be configured to dispatch the commands in the order as received from the host for the commands that are designated for execution by the same flash memory chip and/or by the same channel. Also, the command processor may be configured to dispatch the commands out of order for the commands that are designated for execution by different flash memory chips and/or different channels. In this manner, the command processor is configured to maintain the commands in order that need to be kept in order and, at the same time, the command processor is configured to reorder the commands that do not need to be kept in order such that the command processor may keep substantially all of the flash memory chips and/or channels busy.

According to one general aspect, an apparatus for queuing and ordering commands for a data storage device may include a slot tracker module that is arranged and configured to track available slots for commands from a host, a command transfer module that is operably coupled to the slot tracker module and that is arranged and configured to retrieve commands from the host based on a number of the available slots, a pending command module that is operably coupled to the command transfer module and that is arranged and configured to queue and order the commands from the host for processing using an ordered list that is based on an age of the commands and a task dispatch module that is operably coupled to the pending command module and that is arranged and configured to dispatch the commands for processing using the ordered list from the pending command module and an availability of storage locations.

Implementations may include one or more of the following features. For example, the task dispatch module may be arranged and configured to use the ordered list from the pending command module to maintain an order of the commands as received from the host for the commands that are designated for a same storage location. The task dispatch module may be arranged and configured to dispatch the commands designated for different storage locations out of order.

The storage locations may be arranged and configured into multiple channels with each of the channels including multiple flash memory chips and the task dispatch module may be arranged and configured to maintain an order of the commands as received from the host for the commands that are designated for a same channel. The storage locations may be arranged and configured into multiple channels with each of the channels including multiple flash memory chips and the task dispatch module may be arranged and configured to maintain an order of the commands as received from the host for the commands that are designated for a same flash memory chip.

The storage locations may arranged and configured into multiple channels with each of the channels including multiple flash memory chips and the task dispatch module may be arranged and configured to dispatch the commands designated for different channels out of order. The storage locations may be arranged and configured into multiple channels with each of the channels including multiple flash memory chips and the task dispatch module may be arranged and configured to dispatch the commands designated for different flash memory chips out of order.

In one exemplary implementation, the ordered list may be a doubly linked list. The doubly linked list may be implemented in hardware.

The slot tracker module may be arranged and configured to assign each of the commands a global slot identifier (ID) to track each of the commands and to track the number of the available slots. The slot tracker module, the command transfer module, the pending command module and the task dispatch module may be implemented in hardware as part of a field programmable gate array (FPGA) circuit.

In another general aspect, a data storage device may include multiple flash memory chips and a controller that is operably coupled to the flash memory chips and that is arranged and configured to receive commands from a host. The controller may include a command processor that is arranged and configured to queue and order the commands from the host using an ordered list that is based on an age of the commands, dispatch the commands that are designated for a same flash memory chip in order using the ordered list and dispatch the commands that are designated for different flash memory chips out of order.

Implementations may include one or more of the following features. For example, the controller may be a field programmable gate array (FPGA) controller. The flash memory chips may be arranged and configured into multiple channels with each of the channels including one or more of the flash memory chips and the command processor is arranged and configured to dispatch the commands that are designated for a same channel in order using the ordered list and dispatch the commands that are designated for different channels out of order.

The command processor may be arranged and configured to track available slots for commands from a host and retrieve commands from the host based on a number of the available slots. In one exemplary implementation, the ordered list may be a doubly linked list.

The command processor may include a slot tracker module that is arranged and configured to track available slots for commands from a host, a command transfer module that is operably coupled to the slot tracker module and that is arranged and configured to retrieve commands from the host based on a number of the available slots, a pending command module that is operably coupled to the command transfer module and that is arranged and configured to queue and order the commands from the host for processing using an ordered list that is based on an age of the commands and a task dispatch module that is operably coupled to the pending command module and that is arranged and configured to dispatch the commands for processing using the ordered list from the pending command module and an availability of the flash memory chips.

The data storage device may include a memory board on which the flash memory chips are arranged and configured into multiple channels, with each of the channels being associated with one or more of the flash memory chips and a controller board that is operably connected to the memory board. The controller board may include a high speed interface and the controller that is arranged and configured to receive the commands from the host using the high speed interface. The high speed interface may be a PCI-e interface and the controller may be a field programmable gate array (FPGA) controller.

In another exemplary implementation, the data storage device may include two memory boards on which the flash memory chips are arranged and configured into multiple channels, with each of the channels being associated with one or more of the flash memory chips and a controller board that is operably connected to the memory boards. The controller board may include a high speed interface and the controller that is arranged and configured to receive the commands from the host using the high speed interface, where the memory boards are each separately removable from the controller board.

In another general aspect, a method for queuing and ordering commands for a data storage device may include tracking available slots for commands from a host, retrieving commands from the host based on a number of the available slots, queuing and ordering the commands from the host for processing using an ordered list that is based on an age of the commands and dispatching the commands for processing using the ordered list and an availability of storage locations.

Implementations may include one or more of the following features. For example, the method may include maintaining an order of the commands as received from the host for the commands that are designated for a same storage location. The method may include dispatching commands designated for different storage locations out of order. The method may include assigning each of the commands a global slot identifier (ID) to track each of the commands and to track the number of the available slots.

The details of one or more implementations are set forth in the accompanying drawings and the description below. Other features will be apparent from the description and drawings, and from the claims.

DETAILED DESCRIPTION

This document describes an apparatus, system(s) and techniques for tracking, queuing, ordering and processing commands from a host for execution on a data storage device. A command processor may be configured for tracking, queuing, ordering and processing the commands from the host for execution on the data storage device. The command processor may be configured to dispatch the commands in the order as received from the host for the commands that are designated for execution by the same storage location. Also, the command processor may be configured to dispatch the commands out of order for the commands that are designated for execution by different storage locations.

This document also describes an apparatus, system(s) and techniques for data storage using such a command processor. Such a data storage apparatus may include a controller board having a controller that may be used with one or more different memory boards, with each of the memory boards having multiple flash memory chips. The data storage apparatus may communicate with a host using an interface on the controller board. In this manner, the controller on the controller board may be configured to receive commands from the host using the interface and to execute those commands using the flash memory chips on the memory boards.

Figure 1:
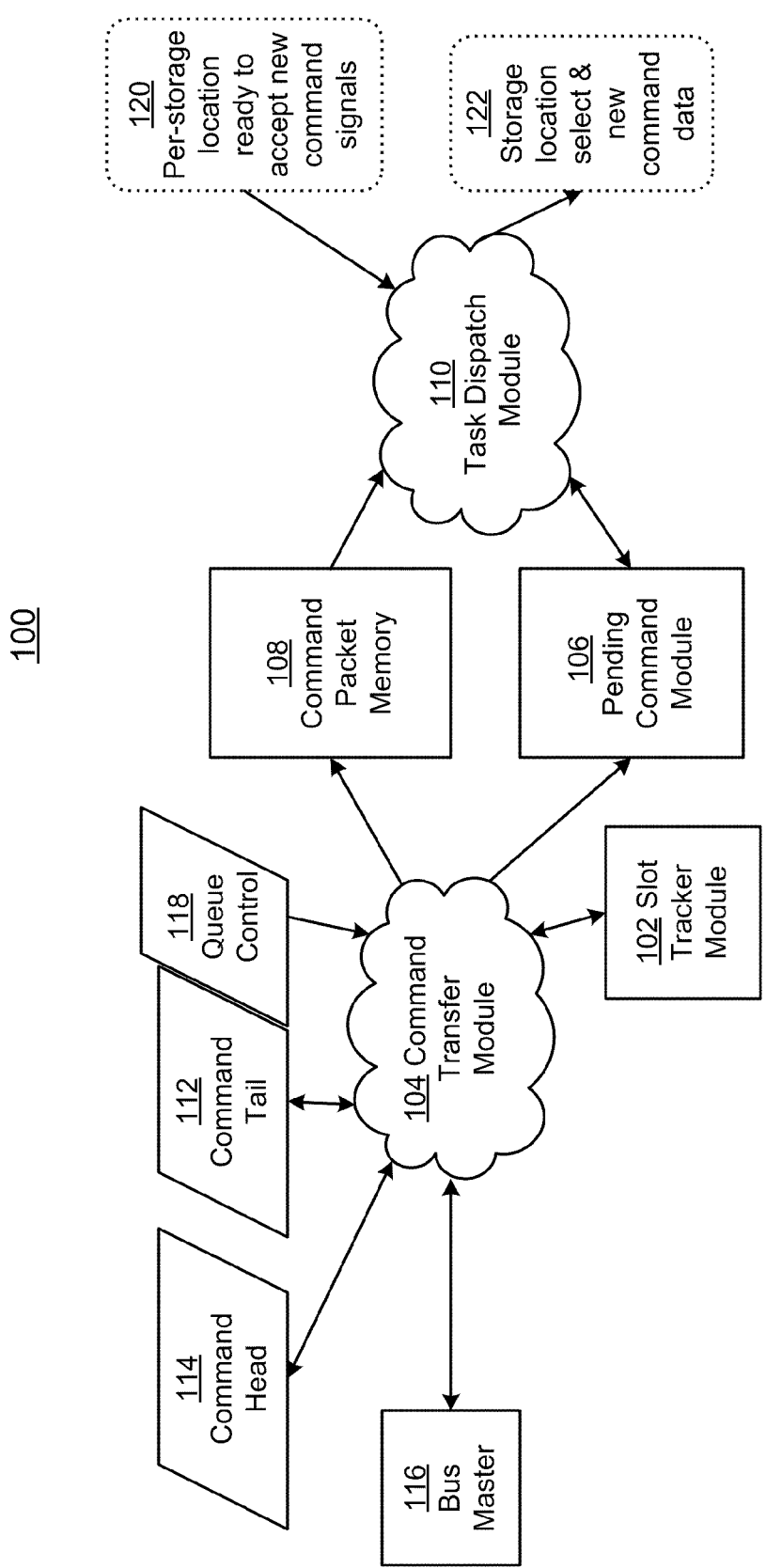
FIG. 1 is an exemplary block diagram of a command processor for a data storage device.

FIG. 1 is a block diagram of a command processor 100. The command processor may include a slot tracker module 102, a command transfer module 104, a pending command module 106, a command packet memory 108, and a task dispatch module 110. The command processor 100 may be implemented in hardware, software or a combination of hardware and software. In one exemplary implementation, the command processor 100 may be implemented as a part of a field programmable gate array (FPGA) controller. The FPGA controller may be configured using firmware or other instructions to program the FPGA controller to perform the functions discussed herein.

The command processor 100 may be arranged and configured to retrieve commands from a host and to queue and order the commands from the host for processing by various storage locations. The command processor 100 may be configured to maximize the availability of the storage locations by attempting to keep all or substantially all of the storage locations busy. The command processor 100 may be configured to dispatch commands designated for the same storage location in order such that the order of the commands received from the host is preserved. The command processor 100 may be configured to reorder and dispatch commands designated for different storage locations out of order. In this manner, the commands received from the host may be processed in parallel by reordering the commands designated for different storage locations and, at the same time, the order of the commands designated for the same storage location is preserved.

In one exemplary implementation, the command processor 100 may use an ordered list to queue and order the commands from the host. In one exemplary implementation, the ordered list may be sorted and/or otherwise ordered based on the age of the commands from the host. For instance, as new commands are received from the host, those commands are placed at the bottom of the ordered list in the order that they were received from the host. In this manner, commands that are dependent on order (e.g., commands designated for the same storage location) are maintained in the correct order.

In one exemplary implementation, the storage locations may include multiple flash memory chips. The flash memory chips may be arranged and configured into multiple channels with each of the channels including one or more of the flash memory chips. The command processor 100 may be arranged and configured to dispatch commands designated for the same channel and/or the same flash memory chip in order based on the ordered list. Also, the command processor 100 may be arranged and configured to dispatch commands designated for different channels and/or different flash memory chips out of order. In this manner, the command processor 100 may, if needed, reorder the commands from the ordered list so that the channels and the flash memory chips may be kept busy at the same time. This enables the commands from the host to be processed in parallel and enables more commands to be processed at the same time on different channels and different flash memory chips.

The commands from the host may be dispatched and tracked under the control of a driver, where the driver may be a computer program product that is tangibly embodied on a storage medium and may include instructions for generating and dispatching commands from the host. The commands from the host may designate a specific storage location, for example, a specific flash memory chip and/or a specific channel. From the host perspective, it may be important that commands designated for the same storage location be executed in the order as specified by the host. For example, it may be important that certain operations generated by the host occur in order on a same flash memory chip. For example, the host may generate and send an erase command and a write command for a specific flash memory chip, where the host desires that the erase command occurs first. It is important that the erase operation occurs first so that the data associated with the write command doesn't get erased immediately after it is written to the flash memory chip.

As another example, for flash memory chips, it may be important to write to pages of an erase block in order. This operation may include multiple commands to perform the operation on the same flash memory chip. In this example, it is necessary to perform these commands for this operation in the order specified by the host. For instance, a single write operation may include more than sixty commands. The command processor 100 may be configured to ensure that commands to the same flash memory chip are performed in order using the ordered list.

In one exemplary implementation, the command processor 100 may be configured to track a number of commands being processed. The command processor 100 may be configured to track a number of available slots for commands to be received and processed. One of the components of the command processor 100, the slot tracker module 102, may be configured to track available slots for commands from the host. The slot tracker module 102 may keep track of the open slots, provide the slots to new commands transferred from the host and designate the slots as open upon completion of the commands.

In one exemplary implementation, the slot tracker module 102 may include a fixed number of slots, where each slot may be designated for a single command. For example, the slot tracker module 102 may include 128 slots. In other exemplary implementations, the slot tracker module 102 may include a different number of fixed slots. Also, for example, the number of slots may be variable or configurable. The slot tracker module 102 may be implemented as a register or memory module in software, hardware or a combination of hardware and software.

The slot tracker module 102 may include a list of slots, where each of the slots is associated with a global slot identifier. As commands are received from the host, the commands are assigned to an available slot and associated with the global slot identifier for that slot. The slot tracker module 102 may be configured to assign each of the commands a global slot identifier, where the number of global slot identifier is fixed to match the number of slots in the slot tracker module 102. The command is associated with the global slot identifier throughout its processing until the command is completed and the slot is released. In one exemplary implementation, the global slot identifier is a tag associated with a particular slot that is assigned to a command that fills that particular slot. The tag is associated with the command and remains with the command until processing of the command is complete and the slot it occupied is released and made available to receive a new command. The commands may not be placed in order of slots, but instead may be placed in any of the available slots and assigned the global slot identifier associated with that slot.

In one exemplary implementation, one of the components of the command processor 100, the command transfer module 104, may be configured to retrieve new commands from the host based on a number of available slots in the slot tracker module 102 and an availability of new commands at the host. In one exemplary implementation, the command transfer module 104 may be implemented as a state machine.

The slot tracker module 102 may provide information to the command transfer module 104 regarding the number of available slots. Also, the command transfer module 104 may query the slot tracker module 102 regarding the number of available slots.

In one exemplary implementation, the command transfer module 104 may use a command tail pointer 112 and a command head pointer 114 to indicate when and how many new commands are available at the host for retrieval. The command transfer module 104 may compare the command tail pointer 112 and the command head pointer 114 to determine whether there are commands available for retrieval from the host. If the command tail pointer 112 and the command head pointer 114 are equal, then no commands are available for transfer. If the command tail pointer 112 is greater than the command head pointer 114, then commands are available for transfer.

In one exemplary implementation, the command tail pointer 112 and the command head pointer 114 may be implemented as registers that are configured to hold a pointer value and may be a part of the command processor 100. The command tail pointer 114 may be written to by the host. For example, the driver may use a memory mapped input/output (MMIO) write to update the command tail pointer 112 when commands are available at the host for retrieval. As commands are retrieved from the host, the command transfer module 104 updates the command head pointer 114.

When the conditions of available slots and available commands at the host are met, the command transfer module 104 may retrieve some or all of the available commands from the host. In one exemplary implementation, the command transfer module 104 may retrieve a group of commands in a single access. For example, the command transfer module 104 may be configured to retrieve a group of eight commands at a time using a direct memory access (DMA) operation from the host. When the commands are retrieved, the command transfer module 104 updates the command head pointer 114. The commands may be retrieved from the host through the bus master 116. The command transfer module 104 also may write to a host command head pointer (not shown) through the bus master 116 using a DMA operation to update the host command head pointer.

The queue control 118 may be configured to enable and disable the command transfer module 104. The queue control 118 may be implemented as a register that receives instructions from the host through the driver. The queue control 118 may be a component of the command processor 100. When the queue control 118 register is set to enable, then the command transfer module 104 may retrieve and process commands from the host. The driver controls the setting of the queue control 118 so that the command transfer module 104 retrieves commands only when the host is ready and has provided the indication that it is ready. When the queue control 118 register is set to disable, then the command transfer module 104 may not retrieve and process command from the host.

The retrieved commands are each assigned to one of the available slots by the slot tracker module 102 and associated with the global slot identifier for that available slot. The data for the commands may be stored in the command packet memory 108. For example, the command packet memory 108 may be implemented as a fixed buffer that is indexed by global slot identifier. The data for a particular command may be stored in the command packet memory 108 and indexed by its assigned global slot identifier. The data for a particular command may remain in the command packet memory 108 until the command is dispatched to the designated storage location by the task dispatch module 110.

The command transfer module 104 also may be configured to provide other components of a controller with information related to the commands as indexed by slot. For example, the command transfer module 104 may provide data to a DMA engine. The command transfer module 104 also may provide status packet header data to a status processor. The command transfer module 104 may provide interrupt group data to an interrupt processor.

The pending command module 106 may be configured to queue and order the commands using an ordered list that is based on an age of the commands. In one exemplary implementation, the pending command module 106 may be implemented as a memory module that is configured to store multiple pointers to queue and order the commands. The pending command module 106 may include a list of the global slot identifiers for the commands that are pending along with a storage location identifier. For example, the storage location identifier may include the designated storage location for where the command is to be processed. The storage location identifier may include a channel identifier and/or a flash memory chip identifier. The storage location identifier is a part of the command and is assigned by the host through its driver.

When a new command is retrieved, the global slot identifier and storage location information are added to the bottom of the ordered list in the pending command module 106. As discussed above, the data for the commands is stored in the command packet memory 108 and indexed by the global slot identifier. When the command is added to the ordered list, a pointer to the previous command is included with the command. Also included is a pointer to the next command. In this manner, each item in the ordered list includes a global task identifier, a storage location identifier, a pointer to the previous command and a pointer to the next command. In this exemplary implementation, the ordered list may be referred to as a doubly linked list. The ordered list is a list of the commands ordered from oldest to newest.

The task dispatch module 110 is configured to remove commands from the ordered list in the pending command module 106 and to dispatch them to the appropriate storage location for processing. The task dispatch module 110 may receive input from the storage locations to indicate that they are ready to accept new commands. In one exemplary implementation, the task dispatch module 110 may receive one or more signals 120 such as signals indicating that one or more of the storage locations are ready to accept new commands. The pending command module 106 may be configured to start at the top of the ordered list with the oldest command first and to make that command available to the task dispatch module 110. The pending command module 106 may continue to make commands available to the task dispatch module 110 in order using the ordered list until a command is removed from the list by the task dispatch module 110. After a command is removed from the ordered list in the pending command module 106, the pending command module 106 plays back the commands remaining in the list to the task dispatch module 110 starting again at the top of the ordered list.

The task dispatch module 110 may be configured to start at the top of the ordered list with the oldest command first and determine whether the storage location is available to receive new commands using the signals 120. If the storage location is ready, then the task dispatch module 110 retrieves the command data from the command packet memory 108 and communicates the command data and a storage location select signal 122 to the storage location. The pending command module 106 then updates the ordered list and the pointers to reflect that the command was dispatched for processing. Once a command has been dispatched, the task dispatch module 110 starts at the top of the ordered list again.

If the storage location is not ready to receive new commands, then the task dispatch module 110 moves to the next command on the ordered list. The task dispatch module 110 determines if the next command is to the same or a different storage location than the skipped command. If the next command is to a same storage location as a skipped command, then the task dispatch module 110 also will skip this command. In this manner, the commands designated for the same storage location are dispatched and processed in order, as received from the host. The task dispatch module 110 preserves the order of commands designated for the same storage location. If the commands are designated for a different storage location, the task dispatch module 110 again determines if the storage location for the next command on the list is ready to accept the new command. If the task dispatch module 110 receives a signal 120 that the storage location is ready to accept a new command, then the command is dispatched by the task dispatch module 110 from the command packet memory 108 to the storage location along with a storage location select signal 122. The pending command module 106 removes the dispatched command from the ordered list and updates the ordered list including updating the pointers that were associated with the command. In this manner, the remaining pointers are linked together upon removal of the dispatched command.

Figure 2:
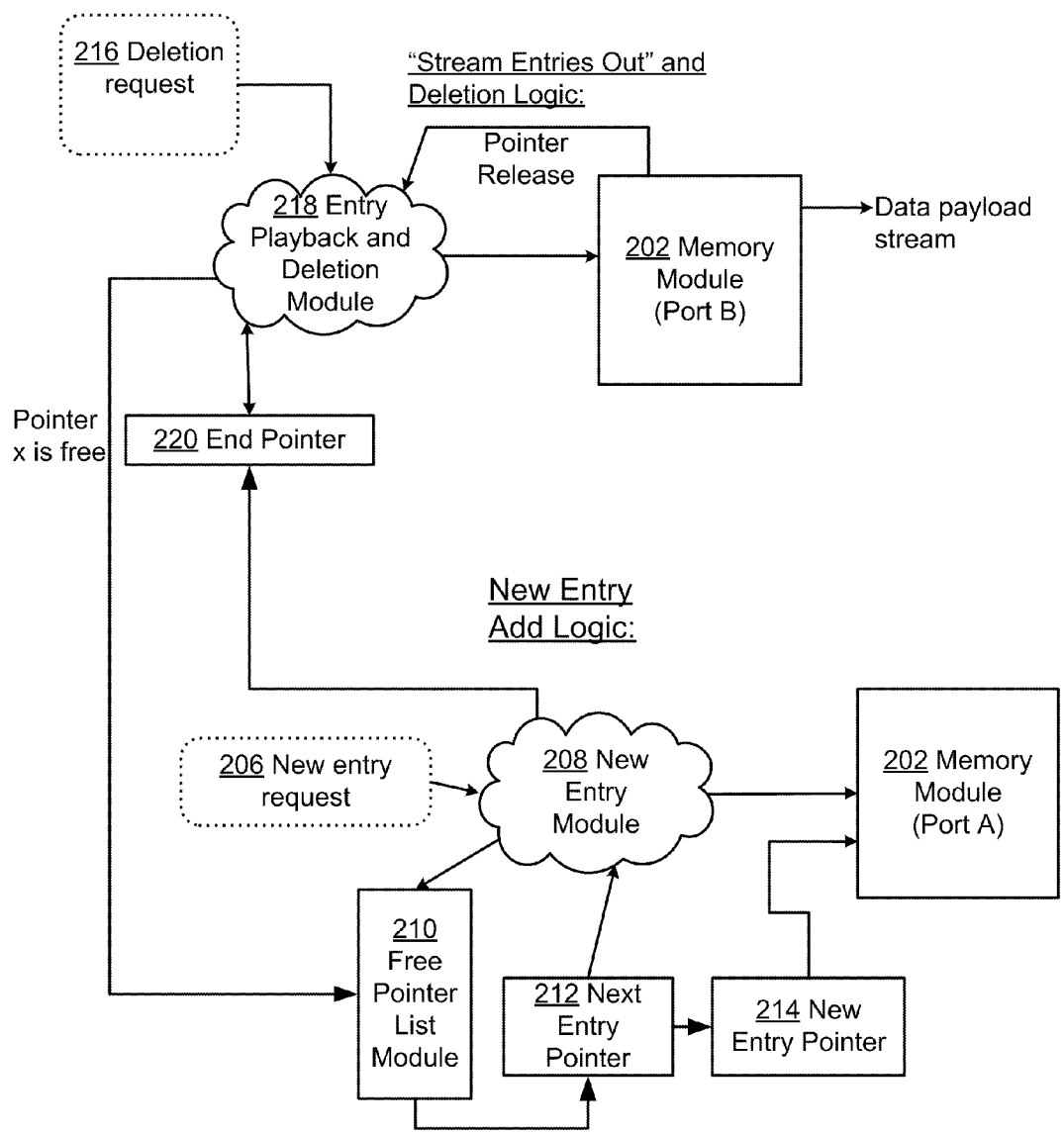
FIG. 2 is an exemplary block diagram of a pending command module.

Referring also to FIG. 2, a block diagram of the pending command module 106 is illustrated. The pending command module 106 may include a single memory module 202 having multiple ports, port A and port B. The memory module 202 may store information related to the pending commands, including the pointer information for each command, where the pointer information may point to the next command and the previous command.

In operation, the command transfer module 104 of FIG. 1 sends a new entry request 206 for a new command to be added to the ordered list to the pending command module 106. The new entry request 206 is received by a new entry module 208. In one exemplary implementation, the new entry module 208 may be implemented as a state machine.

The new entry module 208 receives the new entry request 206 and adds it to the ordered list at the end of the list as the newest command in memory module 202. Also, the new entry module 208 requests pointers from the free pointer list module 210. The free pointer list module 210 may be implemented as a first-in, first-out (FIFO) memory that maintains a list of pointers that can be used for new entries.

When the new entry module 208 requests pointers from the free pointer list module 210, the free pointer list module 210 provides a next entry pointer 212 to the new entry module 208. The next entry pointer 212 is a pointer to where the entry following the current new entry will reside on the ordered list. The current new entry in the list points to this address as its next address. The new entry pointer 214 is a pointer to where the current new entry will reside on the ordered list, which was the previous entry's next entry pointer 212. The last entry in the list points to this address as its next address. The memory module 202 stores the data fields related to the commands and the pointers. When a new entry is added, an end pointer 220 also is updated.

For example, if an entry "X" is to be added, the next entry pointer 212 points to the next entry "Y" and the new entry pointer 214 points to the current entry that is to be added, "X". After "X" is entered and an entry "Y" is to be added, the next entry pointer 212 points to the next entry "Z" and the new entry pointer 214 points to the current entry that is to be added, "Y".

When the task dispatch module 110 of FIG. 1 determines that an entry is to be removed from the ordered list in the memory module 202, the task dispatch module sends a deletion request 216. The deletion request is received by an entry playback and deletion module 218. The entry playback and deletion module 218 may be configured to start at the top of the ordered list with the oldest command first and to make that command available to the task dispatch module 110. The entry playback and deletion module 218 may continue to make commands available to the task dispatch module 110 in order using the ordered list until a command is removed from the list by the task dispatch module 110. After a command is removed from the ordered list, the entry playback and deletion module 218 causes the memory module 202 to dispatch the command and remove it from the ordered list. The pointers are then freed up and the entry playback and deletion module 218 provides an indication to the free pointer list module 210 that the pointers for the removed command are free. The entry playback and deletion module 218 also updates the pointers in the memory module 202 when the command is removed to maintain the correct order of the list. The entry playback and deletion module 218 also plays back the commands remaining in the list to the task dispatch module 110 starting again at the top of the ordered list.

In one exemplary implementation, the entry playback and deletion module 218 may be implemented as a state machine.

The entry playback and deletion module 218 also receives an input of the end pointer 220 from the new entry module 208. The end pointer 220 may be used when the entry playback and deletion module 218 is making commands available to the task dispatch module 110 and when a last entry in the ordered list is removed from the list. In this manner, the end pointer 220 may be updated to point to the end of the ordered list.

Figure 3:
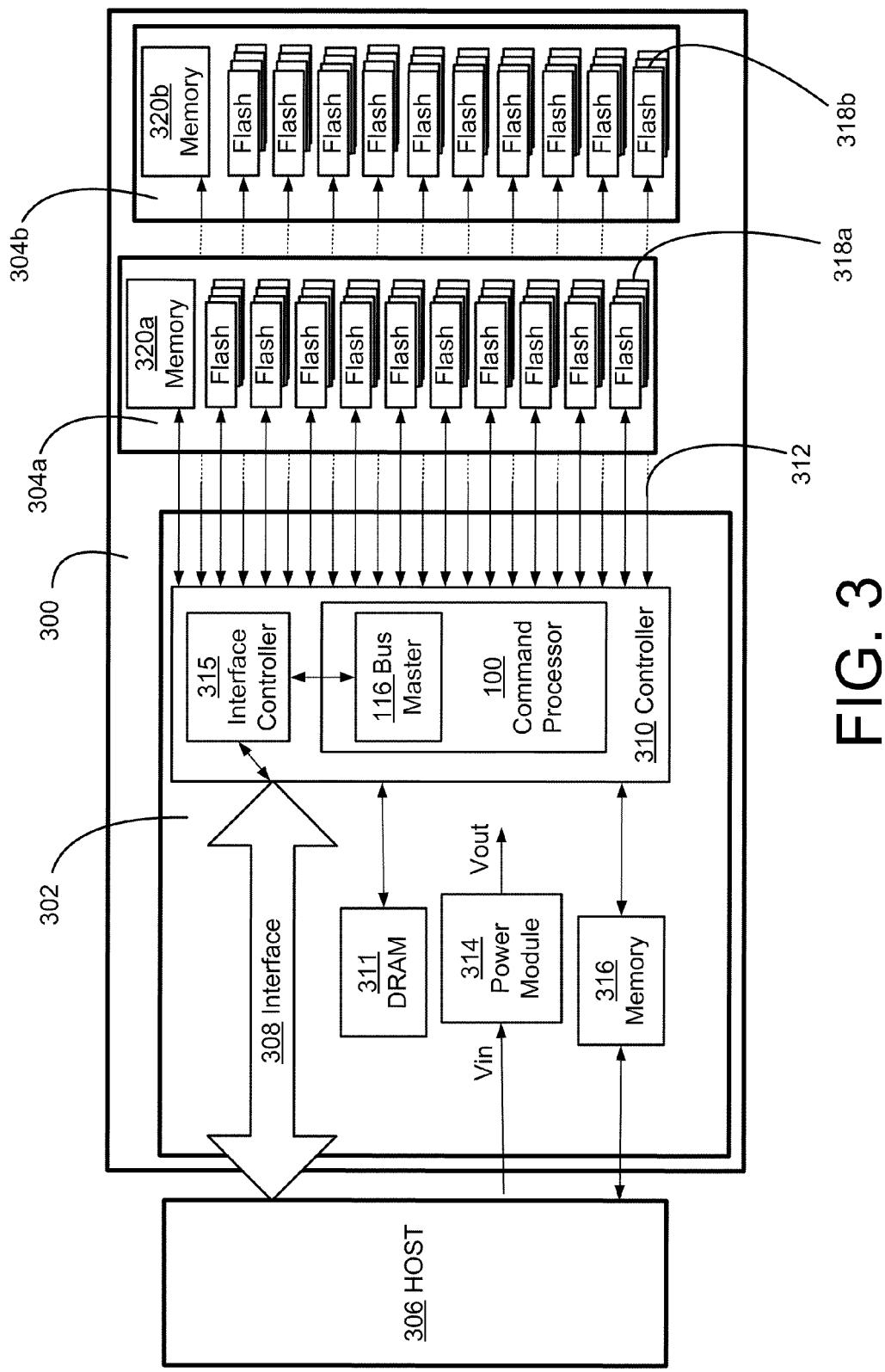
FIG. 3 is an exemplary block diagram of a data storage device.

FIG. 3 is a block diagram of a data storage device 300. The data storage device 300 may include a controller board 302 and one or more memory boards 304a and 304b. The data storage device 300 may communicate with a host 306 over an interface 308. The interface 308 may be between the host 306 and the controller board 302. The controller board 302 may include a controller 310, a DRAM 311, multiple channels 312, a power module 314, and a memory module 316. The controller 310 may include the command processor 100 and the bus master 116, such as the command processor 100 and bus master 116, as described in FIG. 1. The memory boards 304a and 304b may include multiple flash memory chips 318a and 318b on each of the memory boards. The memory boards 304a and 304b also may include a memory device 320a and 320b.

In general, the data storage device 300 may be configured to store data on the flash memory chips 318a and 318b. The host 306 may write data to and read data from the flash memory chips 318a and 318b, as well as cause other operations to be performed with respect to the flash memory chips 318a and 318b. The reading and writing of data between the host 106 and the flash memory chips 318a and 318b, as well as the other operations, may be processed through and controlled by the controller 310 on the controller board 302. The controller 310 may receive commands from the host 306 and cause those commands to be executed using the flash memory chips 318a and 318b on the memory boards 304a and 304b. The communication between the host 306 and the controller 310 may be through the interface 308. The controller 310 may communicate with the flash memory chips 318a and 318b using the channels 312.

The controller board 302 may include DRAM 311. The DRAM 311 may be operably coupled to the controller 310 and may be used to store information. For example, the DRAM 311 may be used to store logical address to physical address maps and bad block information. The DRAM 311 also may be configured to function as a buffer between the host 306 and the flash memory chips 318a and 318b.

As discussed above with respect to FIG. 1, the command processor 100 may be configured to retrieve the commands from the host 306 through the interface 308 and the bus master 116. An interface controller 315 may be configured to interface between the bus mater 116 and the interface 308. The command processor 100 may be arranged and configured to queue and order the commands from the host 306 using the ordered list that is based on the age of the commands. The command processor 100 may be configured to dispatch commands designated for a same flash memory chip (e.g., from the flash memory chips 318a and 318b) and/or designated for a same channel (e.g., from channels 312) in order using the ordered list. At the same time, the command processor 100 may be configured to dispatch commands from the host 306 designated for different flash memory chips and/or different channels out of order. That is, the command processor 100 may sort through the ordered list and dispatch commands out of order with the purpose of keeping the flash memory chips 318a and 318b and the channels 312 busy so that commands from the host 306 are being processed in parallel.

In one exemplary implementation, the controller board 302 and each of the memory boards 304a and 304b are physically separate printed circuit boards (PCBs). The memory board 304a may be on one PCB that is operably connected to the controller board 302 PCB. For example, the memory board 304a may be physically and/or electrically connected to the controller board 302. Similarly, the memory board 304b may be a separate PCB from the memory board 304a and may be operably connected to the controller board 302 PCB. For example, the memory board 304b may be physically and/or electrically connected to the controller board 302. The memory boards 304a and 304b each may be separately disconnected and removable from the controller board 302. For example, the memory board 304a may be disconnected from the controller board 302 and replaced with another memory board (not shown), where the other memory board is operably connected to controller board 302. In this example, either or both of the memory boards 304a and 304b may be swapped out with other memory boards such that the other memory boards may operate with the same controller board 302 and controller 310.

In one exemplary implementation, the controller board 302 and each of the memory boards 304a and 304b may be physically connected in a disk drive form factor. The disk drive form factor may include different sizes such as, for example, a 3.5" disk drive form factor and a 2.5" disk drive form factor.

In one exemplary implementation, the controller board 302 and each of the memory boards 304a and 304b may be electrically connected using a high density ball grid array (BGA) connector. Other variants of BGA connectors may be used including, for example, a fine ball grid array (FBGA) connector, an ultra fine ball grid array (UBGA) connector and a micro ball grid array (MBGA) connector. Other types of electrical connection means also may be used.

Figure 4:
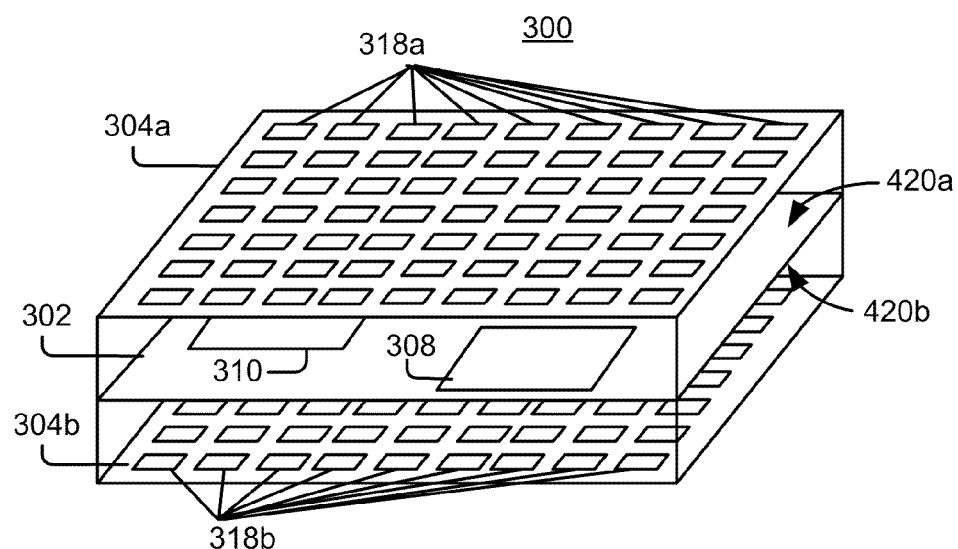
FIG. 4 is an exemplary perspective block diagram of the printed circuit boards of the data storage device.

In one exemplary implementation, the controller board 302, which is its own PCB, may be located physically between each of the memory boards 304a and 304b, which are on their own separate PCBs. Referring also to FIG. 4, the data storage device 300 may include the memory board 304a on one PCB, the controller board 302 on a second PCB, and the memory board 304b on a third PCB. The memory board 304a includes multiple flash memory chips 318a and the memory board 304b includes multiple flash memory chips 318b. The controller board 302 includes the controller 310 and the interface 308 to the host (not shown), as well as other components (not shown).

In the example illustrated by FIG. 4, the memory board 304a may be operably connected to the controller board 302 and located on one side 420a of the controller board 302. For instance, the memory board 304a may be connected to a top side 420a of the controller board 302. The memory board 304b may be operably connected to the controller board 302 and located on a second side 420b of the controller board 302. For instance, the memory board 304b may be connected to a bottom side 420b of the controller board 302.

Other physical and/or electrical connection arrangements between the memory boards 304a and 304b and the controller board 302 are possible. FIG. 4 merely illustrates one exemplary arrangement. For example, the data storage device 300 may include more than two memory board such as three memory boards, four memory boards or more memory boards, where all of the memory boards are connected to a single controller board. In this manner, the data storage device may still be configured in a disk drive form factor. Also, the memory boards may be connected to the controller board in other arrangements such as, for instance, the controller board on the top and the memory cards on the bottom or the controller board on the bottom and the memory cards on the top.

Figure 5:
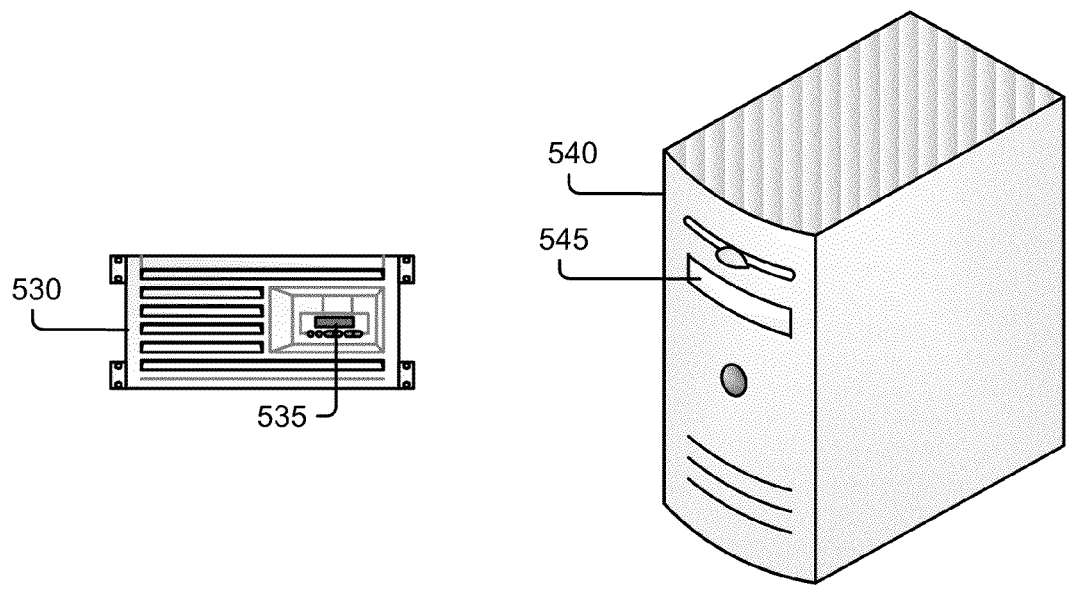
FIG. 5 is an exemplary block diagram of exemplary computing devices for use with the data storage device of FIG. 3.

The data storage device 300 may be arranged and configured to cooperate with a computing device. In one exemplary implementation, the controller board 302 and the memory boards 304a and 304b may be arranged and configured to fit within a drive bay of a computing device. Referring to FIG. 5, two exemplary computing devices are illustrated, namely a server 530 and a server 540. The servers 530 and 540 may be arranged and configured to provide various different types of computing services. The servers 530 and 540 may include a host (e.g., host 306 of FIG. 3) that includes computer program products having instructions that cause one or more processors in the servers 530 and 540 to provide computing services. The type of server may be dependent on one or more application programs that are operating on the server. For instance, the servers 530 and 540 may be application servers, web servers, email servers, search servers, streaming media servers, e-commerce servers, file transfer protocol (FTP) servers, other types of servers or combinations of these servers. The server 530 may be configured to be a rack-mounted server that operates within a server rack. The server 540 may be configured to be a stand-alone server that operates independent of a server rack. Even though the server 540 is not within a server rack, it may be configured to operate with other servers and may be operably connected to other servers. Servers 530 and 540 are meant to illustrate example computing devices and other computing devices, including other types of servers, may be used.

In one exemplary implementation, the data storage device 300 of FIGS. 3 and 4 may be sized to fit within a drive bay 535 of the server 530 of the drive bay 545 of the server 540 to provide data storage functionality for the servers 530 and 540. For instance, the data storage device 300 may be sized to a 3.5" disk drive form factor to fit in the drive bays 535 and 545. The data storage device 300 also may be configured to other sizes. The data storage device 300 may operably connect and communicate with the servers 530 and 540 using the interface 308. In this manner, the host may communicate commands to the controller board 302 using the interface 308 and the controller 310 may execute the commands using the flash memory chips 318a and 318b on the memory boards 304a and 304b. The command processor 100 may retrieve, queue and order the commands from the host for processing on the flash memory chips 318a and 318b.

Referring back to FIG. 3, the interface 308 may include a high speed interface between the controller 310 and the host 306. The high speed interface may enable for fast transfers of data between the host 306 and the flash memory chips 318a and 318b. In one exemplary implementation, the high speed interface may include a PCIe interface. For instance, the PCIe interface may be a PCIe x4 interface or a PCIe x8 interface. The PCIe interface 308 may include a PCIe connector cable assembly to the host 306. In this example, the interface controller 315 may include a PCIe endpoint controller. Other high speed interfaces, connectors and connector assemblies also may be used.

In one exemplary implementation, the communication between the controller board 302 and the flash memory chips 318a and 318b on the memory boards 304a and 304b may be arranged and configured into multiple channels 312. Each of the channels 312 may communicate with one or more flash memory chips 318a and 318b. The controller 310 may be configured such that commands received from the host 306 may be executed by the controller 310 using each of the channels 312 simultaneously or at least substantially simultaneously. In this manner, multiple commands may be executed simultaneously on different channels 312, which may improve throughput of the data storage device 300. The command processor 100 may be configured to enable the multiple commands to be executed simultaneously on different channels 312 by using the ordered list and taking commands designated for different channels out of order to keep the channels busy. In this manner, the multiple commands may be processed in parallel.

In the example of FIG. 3, twenty (20) channels 312 are illustrated. The completely solid lines illustrate the ten (10) channels between the controller 310 and the flash memory chips 318a on the memory board 304a. The mixed solid and dashed lines illustrate the ten (10) channels between the controller 310 and the flash memory chips 318b on the memory board 304b. As illustrated in FIG. 3, each of the channels 312 may support multiple flash memory chips. For instance, each of the channels 312 may support up to 32 flash memory chips. In one exemplary implementation, each of the 20 channels may be configured to support and communicate with 6 flash memory chips. In this example, each of the memory boards 304a and 304b would include 60 flash memory chips each. Depending on the type and the number of the flash memory chips 318a and 318b, the data storage 100 device may be configured to store up to and including multiple terabytes of data.

The controller 310 may include a microcontroller, a FPGA controller, other types of controllers, or combinations of these controllers. In one exemplary implementation, the controller 310 is a microcontroller. The microcontroller may be implemented in hardware, software, or a combination of hardware and software. For example, the microcontroller may be loaded with a computer program product from memory (e.g., memory module 316) including instructions that, when executed, may cause the microcontroller to perform in a certain manner. The microcontroller may be configured to receive commands from the host 306 using the interface 308 and to execute the commands. For instance, the commands may include commands to read, write, copy and erase blocks of data using the flash memory chips 318a and 318b, as well as other commands.

In another exemplary implementation, the controller 310 is a FPGA controller. The FPGA controller may be implemented in hardware, software, or a combination of hardware and software. For example, the FPGA controller may be loaded with firmware from memory (e.g., memory module 316) including instructions that, when executed, may cause the FPGA controller to perform in a certain manner. The FPGA controller may be configured to receive commands from the host 306 using the interface 308 and to execute the commands. For instance, the commands may include commands to read, write, copy and erase blocks of data using the flash memory chips 318a and 318b, as well as other commands.

In one exemplary implementation, the FPGA controller may support multiple interfaces 308 with the host 306. For instance, the FPGA controller may be configured to support multiple PCIe x4 or PCIe x8 interfaces with the host 306.

The memory module 316 may be configured to store data, which may be loaded to the controller 310. For instance, the memory module 316 may be configured to store one or more images for the FPGA controller, where the images include firmware for use by the FPGA controller. The memory module 316 may interface with the host 306 to communicate with the host 306. The memory module 316 may interface directly with the host 306 and/or may interface indirectly with the host 306 through the controller 310. For example, the host 306 may communicate one or more images of firmware to the memory module 316 for storage. In one exemplary implementation, the memory module 316 includes an electrically erasable programmable read-only memory (EEPROM). The memory module 316 also may include other types of memory modules.

The power module 314 may be configured to receive power (Vin), to perform any conversions of the received power and to output an output power (Vout). The power module 314 may receive power (Vin) from the host 306 or from another source. The power module 314 may provide power (Vout) to the controller board 302 and the components on the controller board 302, including the controller 310. The power module 314 also may provide power (Vout) to the memory boards 304a and 304b and the components on the memory boards 304a and 304b, including the flash memory chips 318a and 318b.

In one exemplary implementation, the power module 314 may include one or more direct current (DC) to DC converters. The DC to DC converters may be configured to receive a power in (Vin) and to convert the power to one or more different voltage levels (Vout). For example, the power module 314 may be configured to receive +12 V (Vin) and to convert the power to 3.3v, 1.2v, or 1.8v and to supply the power out (Vout) to the controller board 302 and to the memory boards 304a and 304b.

The memory boards 304a and 304b may be configured to handle different types of flash memory chips 318a and 318b. In one exemplary implementation, the flash memory chips 318a and the flash memory chips 318b may be the same type of flash memory chips including requiring the same voltage from the power module 314 and being from the same flash memory chip vendor. The terms vendor and manufacturer are used interchangeably throughout this document.

In another exemplary implementation, the flash memory chips 318a on the memory board 304a may be a different type of flash memory chip from the flash memory chips 318b on the memory board 304b. For example, the memory board 304a may include SLC NAND flash memory chips and the memory board 304b may include MLC NAND flash memory chips. In another example, the memory board 304a may include flash memory chips from one flash memory chip manufacturer and the memory board 304b may include flash memory chips from a different flash memory chip manufacturer. The flexibility to have all the same type of flash memory chips or to have different types of flash memory chips enables the data storage device 300 to be tailored to different applications being used by the host 306.

In another exemplary implementation, the memory boards 304a and 304b may include different types of flash memory chips on the same memory board. For example, the memory board 304a may include both SLC NAND chips and MLC NAND chips on the same PCB. Similarly, the memory board 304b may include both SLC NAND chips and MLC NAND chips. In this manner, the data storage device 300 may be advantageously tailored to meet the specifications of the host 306.

In another exemplary implementation, the memory board 304a and 304b may include other types of memory devices, including non-flash memory chips. For instance, the memory boards 304a and 304b may include random access memory (RAM) such as, for instance, dynamic RAM (DRAM) and static RAM (SRAM) as well as other types of RAM and other types of memory devices. In one exemplary implementation, the both of the memory boards 304a and 304b may include RAM. In another exemplary implementation, one of the memory boards may include RAM and the other memory board may include flash memory chips. Also, one of the memory boards may include both RAM and flash memory chips.

The memory modules 320a and 320b on the memory boards 304a and 304b may be used to store information related to the flash memory chips 318a and 318b, respectively. In one exemplary implementation, the memory modules 320a and 320b may store device characteristics of the flash memory chips. The device characteristics may include whether the chips are SLC chips or MLC chips, whether the chips are NAND or NOR chips, a number of chip selects, a number of blocks, a number of pages per block, a number of bytes per page and a speed of the chips.

In one exemplary implementation, the memory modules 320a and 320b may include serial EEPROMs. The EEPROMs may store the device characteristics. The device characteristics may be compiled once for any given type of flash memory chip and the appropriate EEPROM image may be generated with the device characteristics. When the memory boards 304a and 304b are operably connected to the controller board 302, then the device characteristics may be read from the EEPROMs such that the controller 310 may automatically recognize the types of flash memory chips 318a and 318b that the controller 310 is controlling. Additionally, the device characteristics may be used to configure the controller 310 to the appropriate parameters for the specific type or types of flash memory chips 318a and 318b.

Figure 6:
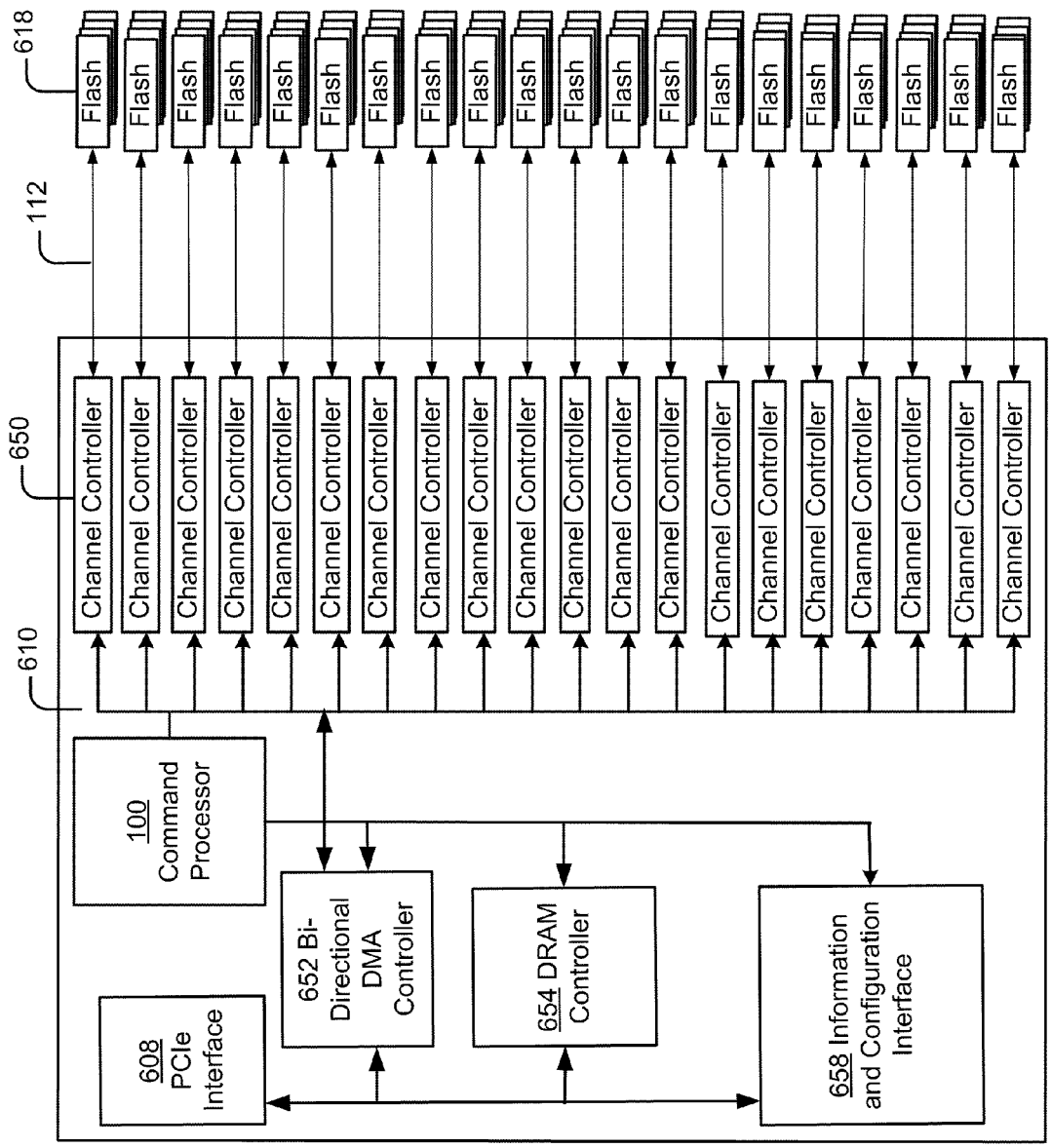
FIG. 6 is an exemplary block diagram of a controller.

As discussed above, the controller 310 may include a FPGA controller. Referring to FIG. 6, an exemplary block diagram of a FPGA controller 610 is illustrated. The FPGA controller may be configured to operate in the manner described above with respect to controller 310 of FIG. 3. The FPGA controller 610 may include multiple channel controllers 650 to connect the multiple channels 112 to the flash memory chips 618. The flash memory chips 618 are illustrated as multiple flash memory chips that connect to each of the channel controllers 650. The flash memory chips 618 are representative of the flash memory chips 318a and 318b of FIG. 3, which are on the separate memory boards 304a and 304b of FIG. 3. The separate memory boards are not shown in the example of FIG. 6. The FPGA controller 610 may include a PCIe interface module 608, a bi-directional direct memory access (DMA) controller 652, a dynamic random access memory (DRAM) controller 654, a command processor 100 (e.g., command processor 100 of FIGS. 1 and 3) and an information and configuration interface module 458.

Information may be communicated with a host (e.g., host 306 of FIG. 3) using an interface. In this example, FIG. 6, the FPGA controller 610 includes a PCIe interface to communicate with the host and a PCIe interface module 608. The PCIe interface module 608 may be arranged and configured to receive commands from the host and to send commands to the host. The PCIe interface module 608 may provide data flow control between the host and the data storage device. The PCIe interface module 608 may enable high speed transfers of data between the host and the controller 610 and ultimately the flash memory chips 618. In one exemplary implementation, the PCIe interface and the PCIe interface module 608 may include a 64-bit bus.

The bi-directional DMA controller 652 may be configured to interface with the PCIe interface 608, the command processor 100 and each of the channel controllers 650. The bi-directional DMA controller 652 enables bi-directional direct memory access between the host and the flash memory chips 618.

The DRAM controller 654 may be arranged and configured to control the translation of logical to physical addresses. For example, the DRAM controller 654 may assist the command processor 100 with the translation of the logical addresses used by the host and the actual physical addresses in the flash memory chips 618 related to data being written to or read from the flash memory chips 618. A logical address received from the host may be translated to a physical address for a location in one of the flash memory chips 618. Similarly, a physical address for a location in one of the flash memory chips 618 may be translated to a logical address and communicated to the host.

The command processor 100 may be arranged and configured to retrieve the commands from the host through the PCIe interface module 608 and to control the execution of the commands through the channel controllers 650. As discussed above, the command processor 100 may maintain a queue for a number of commands to be executed and order the commands using an ordered list to ensure that the oldest commands may be processed first. The command processor 100 may maintain the order of the commands designated for the same flash memory chip and may reorder the commands designated for different flash memory chips. In this manner, multiple commands may be executed simultaneously and each of the channels 112 may be used simultaneously or at least substantially simultaneously.

The command processor 100 may be configured to process commands for different channels 112 out of order and preserve per-channel command ordering. For instance, commands that are received from the host and that are designated for different channels may be processed out of order by the command processor 100. In this manner, the channels may be kept busy. Commands that are received from the host for processing on the same channel may be processed in the order that the commands were received from the host by the command processor 100. In one exemplary implementation, the command processor 100 may be configured to maintain a list of commands received from the host in an oldest-first sorted list to ensure timely execution of the commands.

The channel controllers 650 may be arranged and configured to process commands from the command processor 100. Each of the channel controllers 650 may be configured to process commands for multiple flash memory chips 618. In one exemplary implementation, each of the channel controllers 650 may be configured to process commands for up to and including 32 flash memory chips 618.

The channel controllers 650 may be configured to process the commands from the command processor 100 in order as designated by the command processor 100. Examples of the commands that may be processed include, but are not limited to, reading a flash page, programming a flash page, copying a flash page, erasing a flash block, reading a flash block's metadata, mapping a flash memory chip's bad blocks, and resetting a flash memory chip.

The information and configuration interface module 658 may be arranged and configured to interface with a memory module (e.g., memory module 316 of FIG. 3) to receive configuration information for the FPGA controller 610. For example, the information and configuration interface module 658 may receive one or more images from the memory module to provide firmware to the FPGA controller 610. Modifications to the images and to the firmware may be provided by the host to the controller 610 through the information and configuration interface module 658. Modifications received through the information and configuration interface module 658 may be applied to any of the components of the controller 610 including, for example, the PCIe interface module 608, the bi-directional DMA controller 652, the DRAM controller 654, the command processor 100 and the channel controllers 650. The information and configuration interface module 658 may include one or more registers, which may be modified as necessary by instructions from the host.

The FPGA controller 610 may be arranged and configured to cooperate and process commands in conjunction with the host. The FPGA controller 610 may perform or at least assist in performing error correction, bad block management, logical to physical mapping, garbage collection, wear levelling, partitioning and low level formatting related to the flash memory chips 618.

Figure 7:
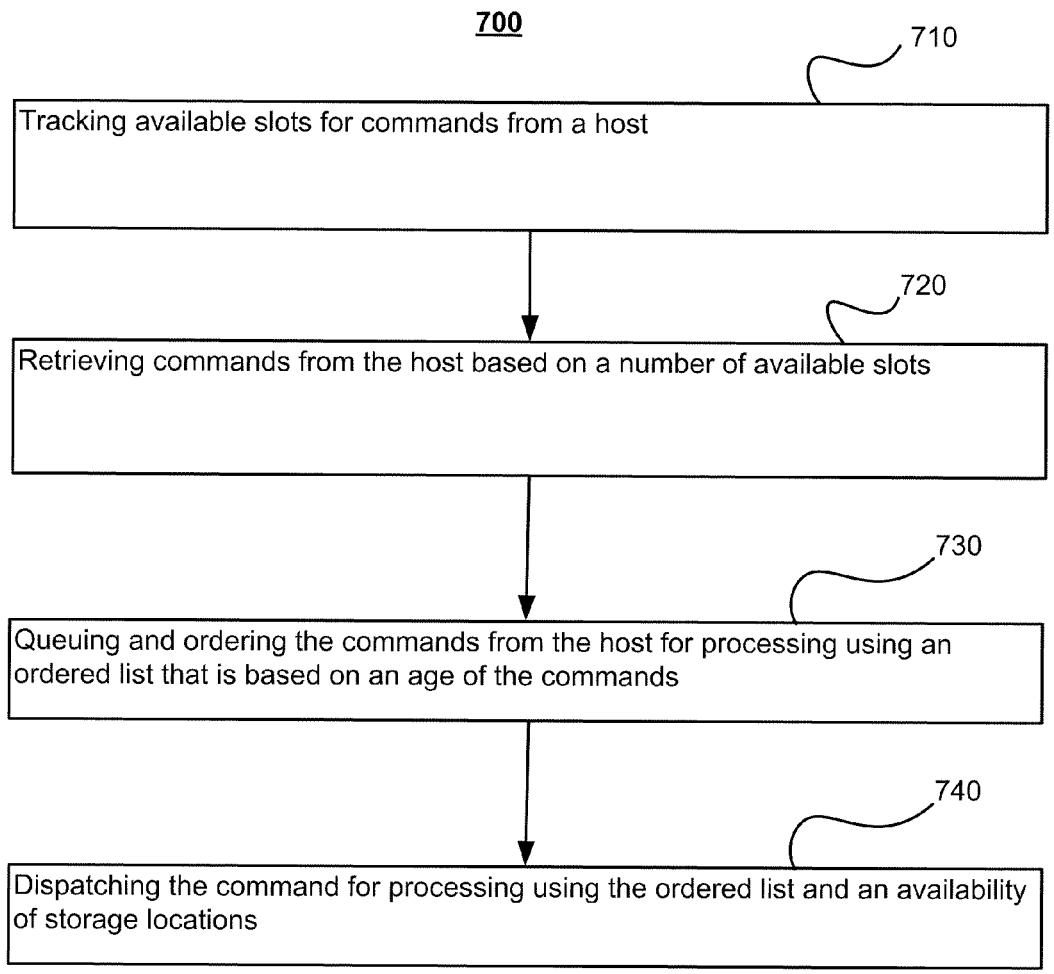
FIG. 7 is an exemplary flowchart illustrating a process for queuing and ordering commands for a data storage device.

Referring to FIG. 7, a process 700 is illustrated for queuing and ordering commands for a data storage device. Process 700 may include tracking available slots for commands from a host (710), retrieving commands from the host based on a number of the available slots (720), queuing and ordering the commands from the host for processing using an ordered list that is based on an age of the commands (730) and dispatching the commands for processing using the ordered list and an availability of storage locations (740). The process 700 may be performed by a command processor such as, for example, the command processor 100 of FIGS. 1 and 3.

The command processor 100 and its components may perform the process 700. For example, the slot tracker module 102 of FIG. 1 may be configured to track available slots for commands from a host (710). In one exemplary implementation, the slot tracker module may maintain a list for a fixed number of slots. When commands are completed, then a slot is opened such that new commands from the host may be retrieved. The slot tracker module also may be configured to assign each of the commands a global slot identifier to track each of the commands and to track the number of available slots.

The command transfer module 104 of FIG. 1 may be configured to retrieve commands from the host based on a number of the available slots (720). In one exemplary implementation, the command transfer module 104 may retrieve commands when slots are available as indicated by the slot tracker module 102 and when the host indicates that commands are ready for retrieval.

The pending command module 106 of FIGS. 1 and 2 may be configured to queue and order the commands from the host for processing using an ordered list that is based on an age of the commands (730). The pending command module 106 may maintain the order of the commands as received from the host for commands that are designated for a same storage location and may reorder the commands designated for different storage locations.

The task dispatch module 110 of FIG. 1 may be configured to dispatch the commands for processing using the ordered list and an availability of storage locations (740). As discussed above, the task dispatch module may search through the ordered list starting with the oldest command first and determine whether its designated storage location is available. If the storage location is available, then the command is dispatched. If the storage location is not available, then that storage location is removed from the list of available storage location. Then, the task dispatch module 110 moves on to the next command on the list that is designated for a non-busy storage location and dispatches that command. In this manner, the task dispatch module 110 can ensure that substantially all of the storage locations are kept busy.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus, including a non-transitory storage medium storing instructions for queuing and ordering commands for a data storage device, comprising:
    a slot tracker module that is arranged and configured to track available slots for commands from a host, wherein each of the available slots is associated with a global slot identifier (ID);
    a command transfer module that is operably coupled to the slot tracker module and that is arranged and configured to retrieve commands from the host based on both a number of the available slots and a number of available commands at the host using a command tail pointer and a command head pointer to indicate the number of available commands at the host, wherein the slot tracker module assigns each of the commands the global slot ID associated with an available slot such that the global slot ID remains associated with the command until processing of the command is complete;
    a pending command module that is operably coupled to the command transfer module and that is arranged and configured to queue and order the commands from the host for processing using an ordered list that is based on an age of the commands; and
    a task dispatch module that is operably coupled to the pending command module and that is arranged and configured to dispatch the commands for processing using the ordered list from the pending command module and an availability of storage locations.

2. The apparatus of claim 1 wherein the task dispatch module is arranged and configured to use the ordered list from the pending command module to maintain an order of the commands as received from the host for the commands that are designated for a same storage location.

3. The apparatus of claim 1 wherein the task dispatch module is arranged and configured to dispatch the commands designated for different storage locations out of order.

4. The apparatus of claim 1 wherein:
    the storage locations are arranged and configured into multiple channels with each of the channels including multiple flash memory chips; and
    the task dispatch module is arranged and configured to maintain an order of the commands as received from the host for the commands that are designated for a same channel.

5. The apparatus of claim 1 wherein:
    the storage locations are arranged and configured into multiple channels with each of the channels including multiple flash memory chips; and
    the task dispatch module is arranged and configured to maintain an order of the commands as received from the host for the commands that are designated for a same flash memory chip.

6. The apparatus of claim 1 wherein:
    the storage locations are arranged and configured into multiple channels with each of the channels including multiple flash memory chips; and
    the task dispatch module is arranged and configured to dispatch the commands designated for different channels out of order.

7. The apparatus of claim 1 wherein:
    the storage locations are arranged and configured into multiple channels with each of the channels including multiple flash memory chips; and
    the task dispatch module is arranged and configured to dispatch the commands designated for different flash memory chips out of order.

8. The apparatus of claim 1 wherein the ordered list is a doubly linked list.

9. The apparatus of claim 8 wherein the doubly linked list is implemented in hardware.

10. The apparatus of claim 1 wherein the slot tracker module, the command transfer module, the pending command module and the task dispatch module are implemented in hardware as part of a field programmable gate array (FPGA) circuit.

11. A data storage device comprising:
multiple flash memory chips; and
a controller that is operably coupled to the flash memory chips and that is arranged and configured to receive commands from a host, wherein the controller comprises:
a command processor that is arranged and configured to:
track available slots for the commands from the host, wherein each of the available slots is associated with a global slot identifier (ID);
retrieve the commands from the host based on both a number of the available slots and a number of available commands at the host using a command tail pointer and a command head pointer to indicate the number of available commands at the host;
assign each of the commands the global slot ID associated with an available slot, wherein the global slot ID remains associated with the command until processing of the command is complete;
queue and order the commands from the host using an ordered list that is based on an age of the commands,
dispatch the commands that are designated for a same flash memory chip in order using the ordered list, and
dispatch the commands that are designated for different flash memory chips out of order.

12. The data storage device of claim 11 wherein the controller is a field programmable gate array (FPGA) controller.

13. The data storage device of claim 11 wherein:
the flash memory chips are arranged and configured into multiple channels with each of the channels including one or more of the flash memory chips; and
the command processor is arranged and configured to:
dispatch the commands that are designated for a same channel in order using the ordered list, and
dispatch the commands that are designated for different channels out of order.

14. The data storage device of claim 11 wherein the ordered list is a doubly linked list.

15. The data storage device of claim 11 wherein the commander processor comprises:
a slot tracker module that is arranged and configured to track available slots for commands from a host;
a command transfer module that is operably coupled to the slot tracker module and that is arranged and configured to retrieve commands from the host based on a number of the available slots;
a pending command module that is operably coupled to the command transfer module and that is arranged and configured to queue and order the commands from the host for processing using an ordered list that is based on an age of the commands; and
a task dispatch module that is operably coupled to the pending command module and that is arranged and configured to dispatch the commands for processing using the ordered list from the pending command module and an availability of the flash memory chips.

16. The data storage device of claim 11 further comprising:
a memory board on which the flash memory chips are arranged and configured into multiple channels, with each of the channels being associated with one or more of the flash memory chips; and
a controller board that is operably connected to the memory board, wherein the controller board comprises;
an interface; and
the controller that is arranged and configured to receive the commands from the host using the interface.

17. The data storage device of claim 16 wherein:
the interface is a PCI-e interface; and
the controller is a field programmable gate array (FPGA) controller.

18. The data storage device of claim 11 further comprising:
two memory board on which the flash memory chips are arranged and configured into multiple channels, with each of the channels being associated with one or more of the flash memory chips; and
a controller board that is operably connected to the memory boards, wherein the controller board comprises:
an interface; and
the controller that is arranged and configured to receive the commands from the host using the interface, wherein the memory boards are each separately removable from the controller board.

19. A method for queuing and ordering commands for a data storage device, the method comprising:
tracking available slots for commands from a host, wherein each of the available slots is associated with a global slot identifier (ID);
retrieving commands from the host based on both a number of the available slots and a number of available commands at the host using a command tail pointer and a command head pointer to indicate the number of available commands at the host;
assigning each of the commands the global slot ID associated with an available slot, wherein the global slot ID remains associated with the command until processing of the command is complete;
queuing and ordering the commands from the host for processing using an ordered list that is based on an age of the commands; and
dispatching the commands for processing using the ordered list and an availability of storage locations.

20. The method as in claim 19 further comprising maintaining an order of the commands as received from the host for the commands that are designated for a same storage location.

21. The method as in claim 19, further comprising dispatching commands designated for different storage locations out of order.

* * * * *

UNITED STATES PATENT AND TRADEMARK OFFICE
CERTIFICATE OF CORRECTION

| | | |
|---|---|---|
| PATENT NO. | : 8,244,962 B2 | Page 1 of 1 |
| APPLICATION NO. | : 12/537722 | |
| DATED | : August 14, 2012 | |
| INVENTOR(S) | : Andrew T. Swing et al. | |

It is certified that error appears in the above-identified patent and that said Letters Patent is hereby corrected as shown below:

In column 21, line 50-51, in claim 15, delete "commander" and insert -- command --, therefor.

In column 22, line 12, in claim 16, delete "comprises;" and insert -- comprises: --, therefor.

In column 22, line 22, in claim 18, delete "board" and insert -- boards --, therefor.

Signed and Sealed this
Fourth Day of December, 2012

David J. Kappos
*Director of the United States Patent and Trademark Office*